(12) United States Patent
Cullen et al.

(10) Patent No.: US 9,935,776 B2
(45) Date of Patent: Apr. 3, 2018

(54) CONTROL SYSTEMS FOR UNMANNED VEHICLES

(71) Applicant: BAE SYSTEMS plc, London (GB)

(72) Inventors: Alan Manuel Cullen, Chelmsford Essex (GB); Nicholas Giacomo Robert Colosimo, Preston Lancashire (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/437,423

(22) PCT Filed: Oct. 22, 2013

(86) PCT No.: PCT/GB2013/052754
§ 371 (c)(1),
(2) Date: Apr. 21, 2015

(87) PCT Pub. No.: WO2014/064435
PCT Pub. Date: May 1, 2014

(65) Prior Publication Data
US 2015/0280919 A1 Oct. 1, 2015

(30) Foreign Application Priority Data

Oct. 25, 2012 (EP) ..................................... 12275162
Oct. 25, 2012 (GB) ..................................... 1219162.3

(51) Int. Cl.
*H04L 9/32* (2006.01)
*G05D 1/00* (2006.01)
(Continued)

(52) U.S. Cl.
CPC .......... *H04L 9/3247* (2013.01); *B64C 39/024* (2013.01); *G05D 1/0077* (2013.01);
(Continued)

(58) Field of Classification Search
CPC ..... B64C 2201/00; H04L 9/00; H04L 9/3247; G06F 21/606; G05D 1/0077
(Continued)

(56) References Cited

U.S. PATENT DOCUMENTS 5,274,554 A * 12/1993 Takats ................. G06F 11/1641
244/76 R
5,794,167 A 8/1998 Gruere et al.
(Continued)

FOREIGN PATENT DOCUMENTS

EP 0754990 A2 1/1997
EP 0760973 B1 8/2001
(Continued)

OTHER PUBLICATIONS

International Preliminary Report on Patentability and Written Opinion received for PCT Application No. PCT/GB2013/052754, dated May 7, 2015. 7 pages.
(Continued)

*Primary Examiner* — Kimberly S Berona
*Assistant Examiner* — Anshul Sood
(74) *Attorney, Agent, or Firm* — Finch & Maloney PLLC

(57) ABSTRACT

A control system for an unmanned vehicle includes a control processing unit which receives input signals from one or more sensors and supplies output signals to one or more actuators. Processing modules are divided into a plurality of successively linked stages. In a first stage, multiple processing modules produce substantially equivalent payload data when operating correctly. Message cryptography units generate cryptographically signed messages containing the payload data. In a second stage, a voting cryptography unit receives and examines the cryptographically signed mes-
(Continued)

sages, and applies voting logic to derive a validated payload data for use by the respective processing module of the second stage.

20 Claims, 4 Drawing Sheets

(51) Int. Cl.
*G06F 21/60* (2013.01)
*B64C 39/02* (2006.01)

(52) U.S. Cl.
CPC ...... *G06F 21/606* (2013.01); *B64C 2201/141* (2013.01); *H04L 2209/24* (2013.01); *H04L 2209/72* (2013.01)

(58) Field of Classification Search
USPC .......................................................... 701/3
See application file for complete search history.

(56) References Cited

U.S. PATENT DOCUMENTS

| 7,302,587 | B2* | 11/2007 | El Fassi | G06F 11/004 |
| | | | | 701/31.4 |
| 2004/0093504 | A1 | 5/2004 | Ishizaki | |
| 2005/0017876 | A1 | 1/2005 | Ziarno | |
| 2006/0174221 | A1* | 8/2006 | Kinsella | G06F 8/36 |
| | | | | 717/106 |
| 2006/0214066 | A1 | 9/2006 | Yount et al. | |
| 2010/0169886 | A1* | 7/2010 | Troxel | G06F 11/187 |
| | | | | 718/101 |
| 2011/0099421 | A1* | 4/2011 | Geist | G06F 11/10 |
| | | | | 714/10 |

FOREIGN PATENT DOCUMENTS

| EP | 1946985 A1 | 12/2006 |
| GB | 1439782 | 6/1976 |
| WO | 2014064435 A2 | 5/2014 |

OTHER PUBLICATIONS

International Search Report and Written Opinion received for PCT Application No. PCT/GB2013/052754, dated Jul. 7, 2014. 9 pages.
Extended European Search Report received for EP 12275162.1, dated Apr. 24, 2013. 4 pages.
GB Intellectual Property Office Search Report under Section 17(5) received for GB Patent Application No. 1219162.3 dated Feb. 25, 2013. 6 pages.

\* cited by examiner

CONTROL SYSTEMS FOR UNMANNED VEHICLES

The present invention relates generally to the field of control systems, and more particularly to control systems suitable for use in unmanned vehicles.

There is a growing demand for unmanned vehicles in both military and civilian fields of use. Unmanned vehicles are widely used for a variety of functions, mostly involving sensing the environment around the vehicle in some way, for surveillance, exploration, research, or search and rescue missions, amongst many other uses. Typically, unmanned vehicles operate in adverse environments and should continue to function even in challenging circumstances, such as due to collisions, impacts or other damage. Unmanned vehicles, even when remotely controlled, usually have some degree of autonomy and thus are especially reliant upon their onboard control systems. Increasingly, more complex control functions are performed autonomously by the onboard control systems of the vehicle, such as operating the engine and control surfaces of an aerial vehicle to ensure stability in the air. In particular, these vital functions should be maintained without interruption, e.g. at least keeping the unmanned aerial vehicle in the air and, if possible, flying straight and level toward a desired waypoint or a safe termination. Although these challenges are predominant for aerial vehicles, similar considerations apply in other environments for unmanned vehicle on the ground, on or in water, or in space.

It is increasingly desired to provide control systems on board the vehicle which are robust and reliable. Also, there is a need in many situations for the control systems to be secure, in that it should be relatively difficult to subvert or interfere with the control system. Hence, there is a desire to address and consider security, particularly for onboard control systems of unmanned vehicles.

Security is an importation consideration during original manufacture of the vehicles, but also needs to be considered subsequently during use, and during repair or routine maintenance. In use, most unmanned vehicles maintain a variety of communication links, with each link providing a potential vulnerability and opportunity for interference or exfiltration. During repair or routine maintenance, it is common for some parts of the control system to be replaced or refurbished and thus a subverted component may be introduced, whether maliciously or unintentionally. Hence, it is desired to address and mitigate these at least some of these security issues.

The example embodiments have been provided with a view to addressing at least some of the difficulties that are encountered in the current control systems, whether those difficulties have been specifically mentioned, or will otherwise be appreciated, from the discussion herein.

According to the present invention there is provided a control apparatus, a control method and a computer-readable storage medium as set forth in the appended claims. Other, optional, features of the invention will be apparent from the dependent claims, and the description which follows.

At least some of the following example embodiments provide an improved control system for use onboard an unmanned vehicle. There now follows a summary of various aspects and advantages according to embodiments of the invention. This summary is provided as an introduction to assist those skilled in the art to more rapidly assimilate the detailed discussion herein and does not and is not intended in any way to limit the scope of the claims that are appended hereto.

In one example there is provided a control system suitable for an unmanned vehicle. The control system may comprise a control processing unit arranged to receive input signals from one or more sensors and to supply output signals to one or more actuators, the control processing unit comprising a plurality of processing modules which are arranged into a plurality of stages, wherein the stages are successively linked with outputs from a plurality of the processing modules in a preceding first stage being coupled to inputs of one or more of the processing modules in a subsequent second stage. In the first stage, the plurality of the processing modules produce substantially equivalent payload data when operating correctly and each of the processing module includes a message cryptography unit which generates cryptographically signed messages containing the payload data. In the second stage, each of the one or more processing modules comprises a voting cryptography unit which receives the cryptographically signed messages from the plurality of processing modules of the first stage, examines the cryptographically signed messages, and applies voting logic to derive a validated payload data from the cryptographically signed messages for use by the processing module of the second stage.

In one example, each of the processing modules is provided as a separate physical hardware component. The modules may be removable and replaceable within the control system. In one example, the processing modules are provided with at least double modular redundancy within each stage. One or more of the stages, and particularly the first stage, may be provided with at least triple modular redundancy. Modular redundancy may vary between stages. In one example, the control processing unit further comprises a third stage which is successively linked to the second stage.

Each of the processing modules may comprise the message cryptography unit generating the cryptographically signed messages containing the payload data for sending from that module.

Each of the processing modules may comprise the voting cryptography unit which performs cryptographic examination of the incoming messages and derives the validated payload data for use by that processing module.

Each processing module may comprises a processor unit arranged to support one or more logical processing applications which use the validated payload data from the voting cryptography unit of that processing module.

In one example, the message cryptography units each produce a message stream comprising the cryptographically signed messages. In one example, each of the voting cryptography units in the processing modules of the subsequent stage is arranged to receive a plurality of the message streams from a plurality of the message cryptography units in the processing modules of the preceding stage. In each case, a many-to-one relationship may be formed. Several of these many-to-one relationships are suitable provided in the control processing unit.

In one example, the control processing unit comprises a plurality of communications networks. In one example, the processing modules within each stage are coupled at their inputs to each of the communications networks and at their outputs to a respective one of the communications networks. In one example, each of these networks carry the message streams from the processing modules in the preceding stage to a plurality of the modules in a subsequent stage.

In one example, the processing modules are arranged to pass the payload data substantially unidirectionally through the control processing unit between the plurality of stages.

In one example, the message cryptography units are arranged to generate the cryptographically signed messages including a source field identifying a source processing module and a destination field identifying a destination processing module, amongst the plurality of processing modules.

In one example, the message cryptography units are arranged to generate outgoing cryptographically signed messages including a time stamp field containing a time stamp, and each of the voting cryptography units includes a time synchronisation unit arranged to validate the time stamp of incoming cryptographically signed messages.

In one example, the message cryptography units are arranged to generate the cryptographically signed messages including an application payload field containing the payload data. In one example, the message cryptography units are arranged to generate the cryptographically signed messages including a cryptography field which provides cryptographic information in relation to the message.

The message cryptography units may further encrypt the messages. In particular, the message cryptography units may encrypt or encode at least the payload field of the messages. The voting cryptography unit may be arranged to perform decryption on each of the encoded or encrypted content of the messages.

In one example, the control system is adapted to be installed onboard an unmanned vehicle. In one example there is provided an unmanned aerial vehicle comprising the control system described herein.

In one example there is provided a control method for an unmanned vehicle. The method may include receiving input signals from one or more sensors; processing the input signals by a plurality of processing modules which are arranged into a plurality of stages, wherein the stages are successively linked with outputs from a plurality of the processing modules in a preceding first stage being coupled to inputs of one or more of the processing modules in a subsequent second stage; producing substantially equivalent payload data by the plurality of the processing modules in the first stage when operating correctly and generating cryptographically signed messages containing the payload data by a message cryptography unit in each of the processing modules of the first stage, applying voting logic to cryptographically signed messages by a voting cryptography unit in the or each processing module of the second stage to derive a validated payload data from the cryptographically signed messages for use by the processing module of the second stage; generating an output signal using the validated payload data; and supplying the output signals to one or more actuators.

In one example the method includes sending a message stream comprising the cryptographically signed messages by each of the message cryptography units of the processing modules of the first stage, and receiving the message streams by each of the voting cryptography units in the processing modules of the subsequent stage.

In one example the method includes carrying the message streams over a plurality of communications networks, wherein the processing modules within each stage are coupled at their inputs to each of the communications networks and at their outputs to a respective one of the communications networks, each of the networks carrying the message streams from the processing modules in the preceding stage to a plurality of the modules in a subsequent stage.

In one example the method includes cryptographically examining the cryptographically signed messages and raising a failure alert condition when the cryptographically signed messages fail the cryptographic examination.

In one example the method includes examining the payload data in the cryptographically signed messages and raising a failure alert condition when the payload data is inconsistent between the messages.

In one example, a tangible, non-transient computer-readable storage medium is provided having recorded thereon instructions which, when implemented by a computer device, cause the computer device to be arranged as set forth herein and/or which cause the computer device to perform the method as set forth herein.

For a better understanding of the invention, and to show how example embodiments may be carried into effect, reference will now be made to the accompanying drawings in which.

The example embodiments will be discussed in detail in relation to unmanned vehicles, and especially unmanned aerial vehicles. However, the teachings, principles and techniques of the present invention are also applicable in many other example embodiments. For example, the discussion herein is also relevant to control systems for manned vehicles or other, non-vehicular environments and applications such as process control, as will appreciated by those skilled in the art.

Figure 1:
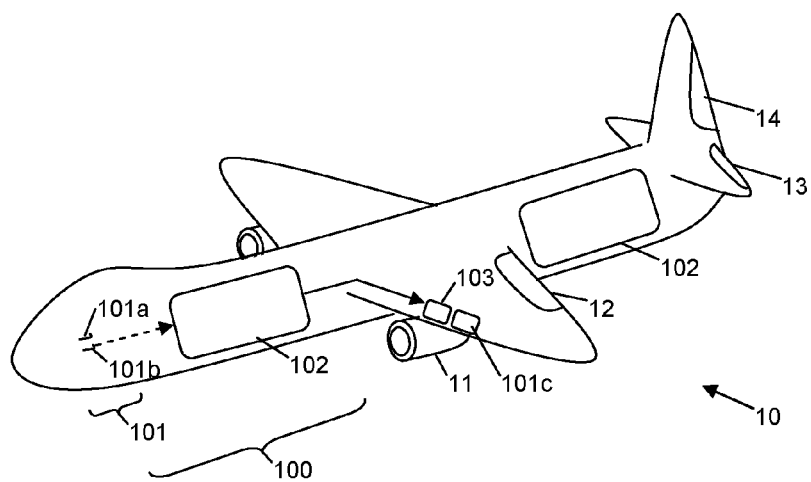
FIG. 1 is a schematic overview of an example unmanned vehicle.

FIG. 1 is a schematic overview of an unmanned aerial vehicle in which the example embodiments may be applied. The vehicle 10 includes one or more onboard control systems 100. As a simplified example, the onboard control system 100 is operable to maintain safe flight of the vehicle. In this example, the control system includes a plurality of input sensors 101, a control processing unit 102, and one or more actuators 103. As a practical illustration, the sensors 101 may include at least first and second air speed sensors 101a, 101b. The control processing unit 102 performs flight control processing functions and applies appropriate control signals to the actuators 103 based on the information received from the airspeed sensor inputs 101a, 101b. In this example, the actuators 103 operate flight control components of the vehicle such as the engine 11 and flight control surfaces 12, 13, 14 (e.g. ailerons, elevator, rudder). Further sensors 101c may provide feedback to the control processing unit 102, such as confirming engine speed, rudder position, etc. Of course, many other examples of the sensors 101 and actuators 103 will be appropriate in other specific embodiments.

In this example, the control system 100 is tasked to maintain the vital control operations which are required for flight by the unmanned aerial vehicle 10. Thus, the control processing unit 102 should operate continuously and not be interrupted, even temporarily, due to adverse environmental circumstances, damage, breakdowns or attacks.

Figure 2:
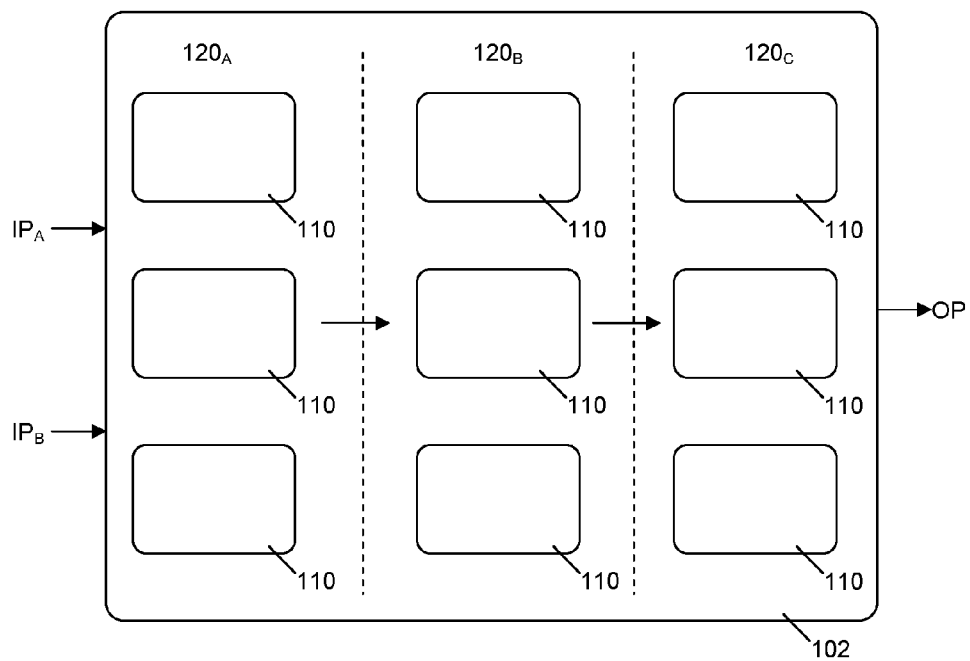
FIG. 2 is a schematic view of an example control system.

FIG. 2 is a schematic view illustrating the onboard control system 100 in more detail, particularly in relation to the control processing unit 102. Generally, the control processing unit 102 comprises a plurality of processing modules 110. In the example embodiments, each module 110 may be a separate physical component, i.e. a separate hardware module. As will be explained further below, each module 110 may support one or more processing functions, which are suitably implemented as software within the respective hardware of this processing module. In some examples, each module 110 may be a separately constructed and separately replaceable component.

As illustrated in FIG. 2, the plurality of processing modules 110 are each allocated to one of a plurality of processing stages 120, with each stage comprising two or more, and preferably three or more, of the processing modules 110. As illustrated in FIG. 2, the processing stages 120 are successively linked. Information flows from one stage to the next to pass through the control processing unit 102. In the illustrated embodiments, information flows substantially unidirectionally through the control processing unit 102, in this case from left to right in the diagrams.

Notably, the processing modules 110 are provided with redundancy. In particular, the processing modules 110 may be provided with at least double modular redundancy. In the example embodiments, the processing modules 110 may be implemented as physically separate components and, within one stage, those particular processing modules may be located, for example, in different parts or regions of the vehicle 10. Further, the processing modules 110 may be provided with diversity. For example, the processing modules 110 may deliberately have different physical components, or be obtained from different suppliers or manufacturers.

In this illustrated example, each stage 120 has been provided with triple modular redundancy. Further, different processing stages 120 may have differing levels of redundancy by having a smaller or larger number of replications compared with neighbouring stages. That is, greater or lesser levels of redundancy may be provided in one or more of the stages. However, for ease of illustration, the following described examples assume that triple modular redundancy is applied to each of the stages.

The example control processing unit 102 of FIG. 2 has been illustrated with three separate stages $120_A$, $120_B$, $120_C$. In other examples, the control processing unit 102 may include further stages which are likewise coupled together with the output(s) from each processing module 110 in the first stage being coupled to the inputs of the processing modules 110 in the second stage, and so on. In practical embodiments the control unit 120 may include up to about ten sequential stages coupled in this manner, depending upon a particular implementation.

As an example, air speed signals $IP_A$, $IP_B$ are provided as two respective inputs to the control processing unit 102 as shown in FIG. 2, which may be derived from the air speed sensors 101a, 101b as shown in FIG. 1. The control processing unit 102 of FIG. 2 may produce at least one output signal OP, which is suitably directed to control one of the actuators 103 as shown in FIG. 1.

Figure 3:
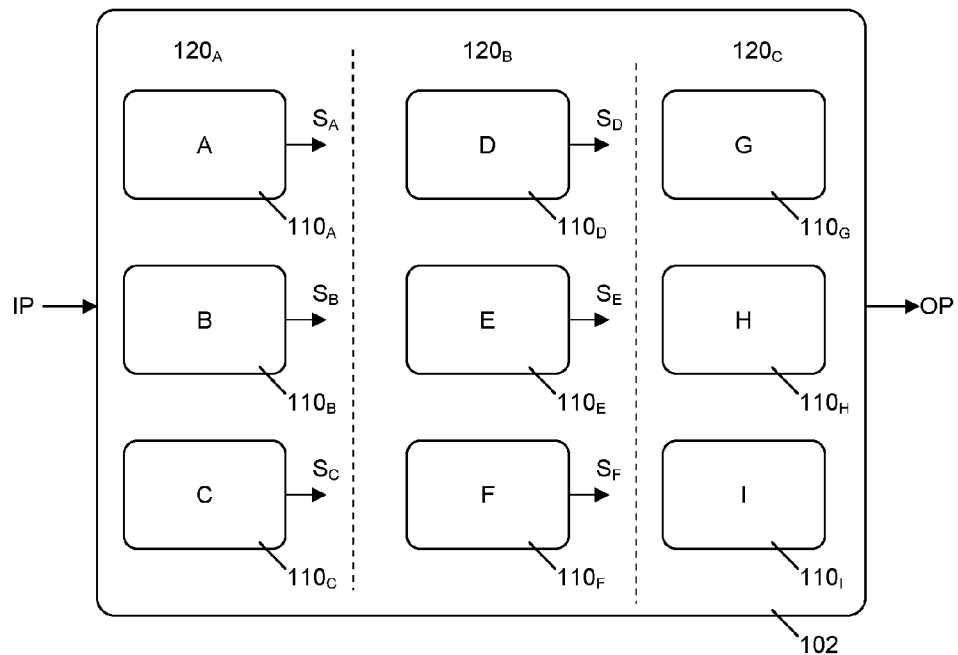
FIG. 3 is a schematic view of an example control processing unit.

FIG. 3 is a schematic diagram showing the example control processing unit 102 in more detail. In particular, FIG. 3 illustrates an upstream stage $120_A$ comprising processing modules $110_A$, $110_B$, $110_C$ acting as input modules, a current stage $120_B$ containing one or more current modules $110_D$, $110_E$, $110_F$ which are currently under consideration, and an output stage $120_C$ containing processing modules $110_G$, $110_H$, $110_I$ in this case acting as output modules.

In this illustrative example, the input modules $110_{A-C}$ each receive the incoming signal IP, from the sensors 101 and each provide a respective processed message stream $S_A$, $S_B$, $S_C$. For example, the message streams $S_A$, $S_B$, $S_C$ contain information representing a currently determined air speed following initial processing by the input modules $110_{A-C}$ of the incoming air speed values from the air speed sensors 101a, 101b of FIG. 1.

The input modules $110_A$-$110_C$ within the first stage $120_A$ provide a plurality of separate processing paths A, B, C. These processing paths are substantially independent. As a result, the processing modules $110_A$-$110_C$ in the first stage 120A produce the content of respective message streams $S_A$, $S_B$, $S_C$ without interference from any of the other modules in this stage. The input modules $110_A$-$110_C$ of the first stage $120_A$ should, if functioning correctly, each produce message streams $S_A$, $S_B$, $S_C$ having substantially equivalent data payloads by performing equivalent processing on the input or inputs in question.

In this example, the message stream $S_A$ is supplied to each of the plurality of modules $110_{D-F}$ in the operating stage $120_B$. Likewise, the second message stream $S_B$ is provided to each of the modules $110_{D-F}$ in the operating stage $120_B$, and the same for the third message stream $S_C$. In turn, each of the processing modules 110 in the operating stage $120_B$ performs a processing operation D, E, F and produces substantially equivalent message streams $S_D$, $S_E$, $S_F$. These processed streams are then supplied in turn to each of the processing modules 110 in the third stage $120_C$. In this example, the third stage $120_C$ performs processing operations G, H & I which supply one or more outputs OP. Referring again to FIG. 1, these one or more outputs OP are suitably connected to the downstream actuators 103.

Figure 4:
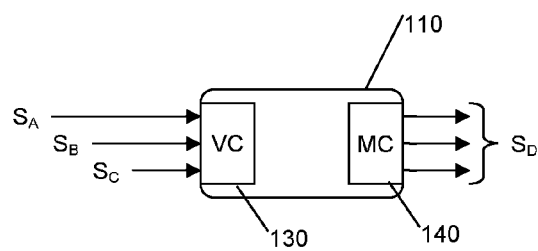
FIG. 4 is a schematic view of a processing module.

FIG. 4 shows one of the processing modules 110 in more detail, comprising a voting cryptography (VC) unit 130 and a message cryptography (MC) unit 140. The VC unit 130 receives the supplied input message streams, in this case the message streams $S_A$, $S_B$ & $S_C$, from the preceding stage. The MC unit 140 supplies the processed output signal, in this case the message stream $S_D$, as the output to the one or more processing modules 110 of the subsequent stage.

Figure 5:
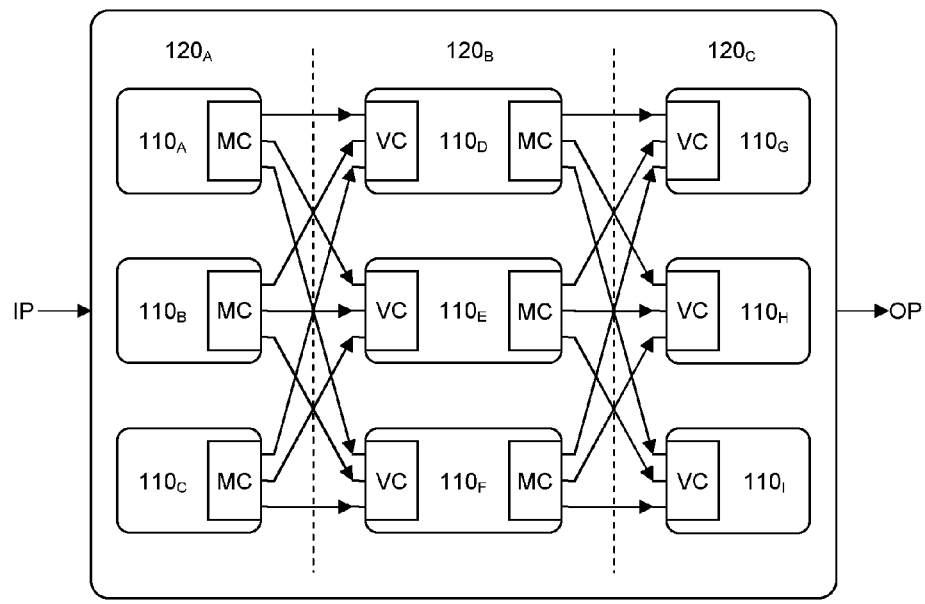
FIG. 5 is a further schematic view of the example control processing unit.

FIG. 5 shows connections within the control processing unit 102 in more detail. As shown in FIG. 5, the MC unit 140 within each of a plurality of modules 110 of the first stage 120A is connected to the VC unit 130 within a module 110 of the second stage 120B. In the illustrated example, each MC unit 140 in the first stage is coupled to each of the plurality of VC units 130 in the modules of the subsequent second stage.

Figure 6:
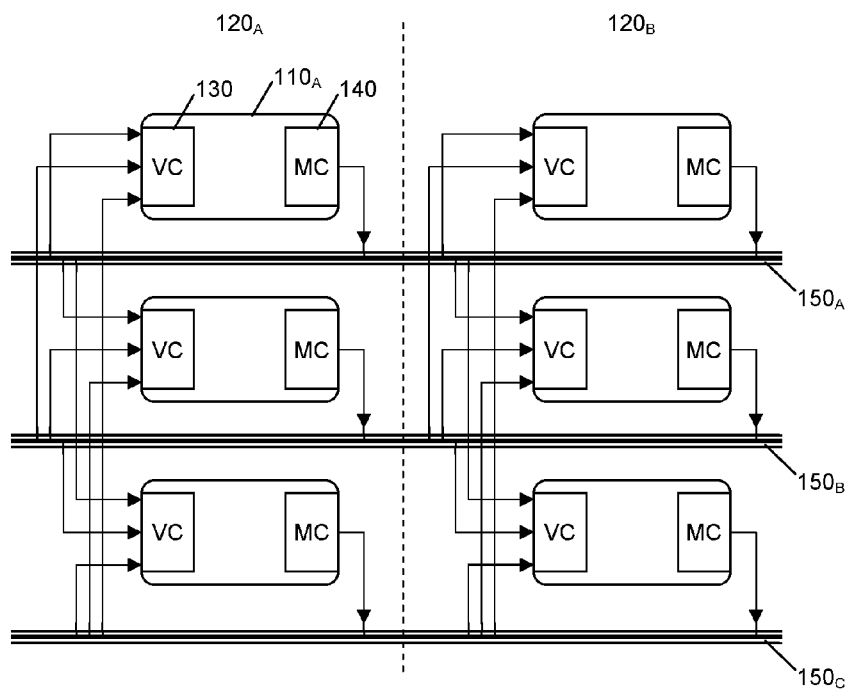
FIG. 6 is a further schematic view of the example control processing unit.

FIG. 6 shows a further example arrangement of a plurality of communications networks within the control processing unit 102. In this example, the processing modules 110 within each stage 120 are coupled at their inputs to a plurality of separate and distinct communications networks $150_A$, $150_B$, $150_C$. In this example, each of the plural communications networks is a bus. In another example embodiment a plurality of separate packet switched networks are provided.

As shown in FIG. 6, the output signal from each processing module is provided only to one of the communications networks $150_A$, $150_B$ or $150_C$ carrying communications from this particular processing module 100. Thus, each message cryptography MC unit 140 provides an output to a respective one of those networks 150. Each voting cryptography VC unit 130 within each processing module 110 receives a plurality of input message streams, wherein each message stream is derived from a corresponding one of the separate communications network 150.

Considering the first processing module 110A shown in FIG. 6, three separate inputs are provided to the voting cryptography unit 130 with each of these inputs being taken from a separate one of the busses $150_A$, $150_B$, $150_C$. The output from the message cryptography MC unit 140 is provided to only one of the busses $150_A$, $150_B$, $150_C$. This communication arrangement as shown in FIG. 6 is useful in particular for avoiding common mode communications failures between stages.

For completeness, each of the VC units 130 is suitably not able to write to the networks 150. In this case, the inputs to each voting cryptography unit are unidirectional, which advantageously prohibits a subverted or malfunctioning processing unit from contaminating any of the busses $150_B$, $150_C$ other than the one bus $150_A$ connected to the MC unit 140 at its output.

Figure 7:
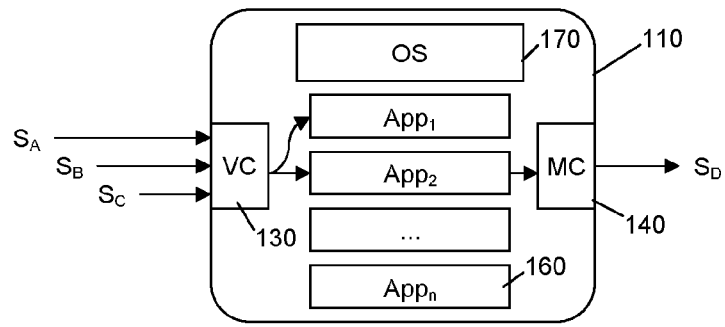
FIG. 7 is a further schematic view of the processing module.

FIG. 7 shows an example embodiment of one of the processing modules 110 in more detail. Here, the processing module 110 may include an operating system (OS) 170 and one or more applications 160, in this case $APP_1$-$APP_n$ where n is a positive integer. In this example, the voting cryptography unit 130 receives three input message streams $S_A$, $S_B$, $S_C$, with each input message stream suitably being carried by one associated communication network as described above. The voting cryptography unit 130 may include appropriate communications units, such as providing a network interface card functionality, for connectivity with the respective network. In practical embodiments, the network interface unit and the processor unit may be provided within the same physical card, as is widely known for rack-based computing systems. The VC unit 130 is arranged to perform the voting cryptography function described herein and, as a result, to extract information which is applied to one or more of the functional applications 160 within this processing module. That is, the applications 160 suitably implement the functional or logical processing operations, e.g. by being provided as software components executing on the hardware of this module 110.

The message cryptography unit 140 may receive information (i.e. payload data) from one or more of the applications 160 ready to be transmitted to another application 160, which may reside in a subsequent processing module 110. The MC unit 140 packages the information as the output message stream $S_D$, using the message cryptography functions described herein.

Figure 8:
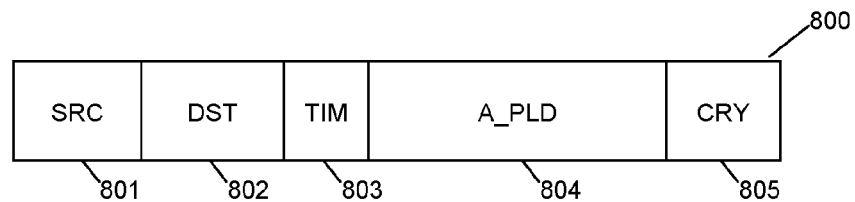
FIG. 8 is a schematic view of an example message packet as used within the example control system.

FIG. 8 shows an example message format as may be used within the control processing system of the example embodiments. The illustrated message 800 includes a source field (SRC) 801 and a destination field (DST) 802, which in the example embodiments allows for transportation of the message 800 between physically separate hardware modules 110 across the respective communication network or networks 150 as described above. A time stamp field (TIM) 803 may be provided, which is useful particularly to protect against replay attacks and delayed messages.

The example control processing system is advantageously a synchronous system. The time stamp field 803 allows the voting cryptography unit VC 130 within each processing module 110 to verify that the message 800 is received at the expected time or within an expected time frame. The time stamp may be defined relative to a local clock signal or a remote clock signal, or other logical reference. A numerically increasing (or decreasing) logical clock count may be used in one example implementation.

The message 800 suitably includes an application payload field (A_PLD) 804. The application payload is generated by one of the applications 160 within the respective processing module 110 and is to be supplied to another application 160, suitably within a subsequent processing module 110 in one of the other, later, stages 120. However, the application payload field 804 may take any suitable form as needed by the plurality of control-related applications 160 running within the control processing unit 102. In the example embodiments, some or all of the content of the application payload field 804 may, optionally, be encoded or encrypted for confidentiality.

In the example embodiments, the message 800 includes a cryptography field (CRY) 805 which provide cryptographic information in relation to the message 800. The cryptography field 805 suitably comprises a digital signature, which is generated by a message source. In the example embodiments, the message source for the message package 800 is the MC unit 140 within the transmitting processing module 110. The cryptographic information field 805 may also include other cryptographic information such as an initialisation vector, padding and so forth. The digital signature in the cryptography field is suitably generated based on the content of the message, i.e. with respect to the data in the fields 801, 802, 803 & 804.

The cryptographic information field 805 may be adapted according to the chosen cryptographic implementation. Public key cryptography is applicable in some embodiments, particularly to improve scalability by having fewer keys to install. Other example embodiments benefit from identity based encryption (IBE) which avoids the inconveniences of public key certificates by generating a pair-wise shared key for encryption. Symmetric encryption is used in some example embodiments, being relatively fast. Identity based encryption is also useful to support non-repudiation, unlike a shared key approach. One example embodiment uses hash-based message authentication codes (HMAC) as described, for example, in RFC2104 (Request For Comments 2104).

Figure 9:
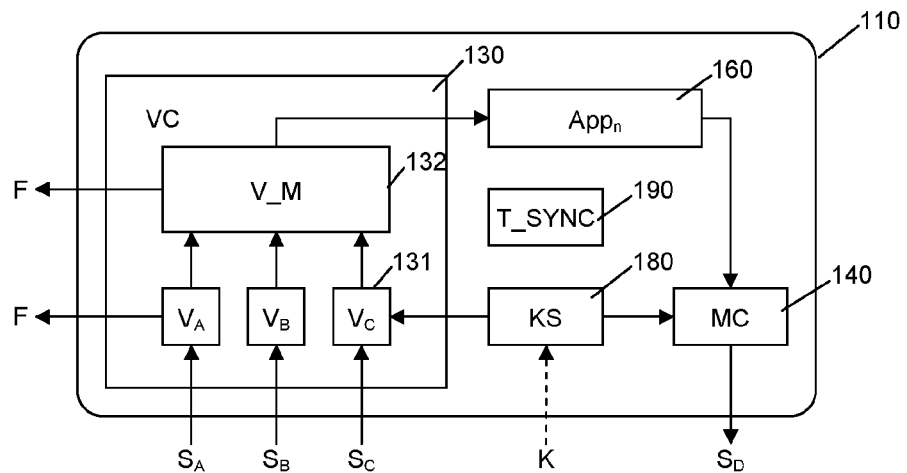
FIG. 9 is a further schematic view of the example processing module.

FIG. 9 is a schematic diagram showing a further example embodiment of one of the processing modules 110. As described above, the processing module 110 suitably includes at least one voting cryptography VC unit 130 and at least one message cryptography MC unit 140, and suitably also one or more applications ($App_n$) 160. As noted above, the applications 160 perform processing tasks appropriate to the control functions of the control processing unit 102 to generate the information which is passed to subsequent stages in the outgoing message stream. The message cryptography unit 140 is arranged to cryptographically sign each of the outgoing messages in message stream $S_D$.

As shown in FIG. 9, the example processing module 110 may further include a key store KS 180 and a time synchronisation unit T_SYNC 190. The key store KS 180 stores one or more cryptographic keys K. The keys are suitably installed within the processing module 100 pre-mission and thus prior to active service of the unmanned vehicle 10. The key store 180 is arranged to distribute the cryptographic keys K to the voting cryptography unit 130 and the message cryptography unit 140.

The VC unit 130 may comprise a plurality of signature verification units 131. In this example, the input message streams $S_A$, $S_B$ and $S_C$ are applied to first, second and third signature verification units $V_A$, $V_B$, $V_C$ 131 which verify the cryptographic signatures within the received messages. Optionally, each signature verification unit 131 is further arranged to perform decryption of the received messages, in particular to perform decryption of encrypted content within the application payload field 804.

A voting master (V_M) unit 132 is arranged to determine a majority vote from amongst the received and acceptably signed messages obtained via the signature verification units 131. The voting master unit 132 determines the majority vote from amongst the received information payload and supplies the voted information content to the applications 160.

In one example, the voting master unit collects and compares the payload data from each of the plurality of messages which are received within one particular clock cycle. The voting master unit thus establishes the validated payload data within each clock cycle. Other more complex voting logic may also be applied, such as voting schemes which consider multiple data items within each message or consider the payload over multiple clock cycles.

As noted in FIG. 9, the voting majority unit 132 and/or the signature verification units 131 may perform fault reporting upon detecting an anomalous result and output fault signals F.

In the example embodiments, the control system 100 is synchronised. The time synchronisation unit 190 supplies time (clock) information to synchronise all of the components within this processing module 110. Thus, each VC unit 130 is synchronised and is aware of the timing when each input is expected from the related MC unit 140 in each of the processing modules 110 of the preceding stage. As a result, in at least some of the example embodiments, it is relatively difficult for a malfunctioning processing module to maintain proper synchronisation in the message stream. Erroneous payload data may be detected within one clock cycle, or within a few clock cycles, due to the voting discrepancy. Thus rapid detection may be achieved.

All of the inputs received by the VC unit from the MC units of the preceding stage contain substantially equivalent inputs in an error-free system. In the example embodiments, the information payload transferred between the stages 120 is cryptographically signed. Also, each of the VC units determines a majority from amongst the received inputs in the event that one of the more of these inputs is missing, in the event that information content within the inputs is different between respective inputs, or in the event that the cryptography reveals that one or more of the inputs has been subverted, or tampered with, or has a fault.

The control processor unit 102 of the example embodiments has a number of important advantages. Any processor module 110 which is subverted, e.g. by being infected with malware, has a minimal impact upon the processing functions performed by other processing modules 110. The VC unit 130 in the downstream module 110 is arranged to detect an anomalous output in the messages produced by the MC unit 140 in the infected processing module 110 of the preceding stage. The anomalous output is quickly discovered by considering the voting and cryptographic functions of the VC units.

This approach also addresses other forms of hardware and software failures within any specific processing module 110. With the redundancy and diversity discussed above, the system is well prepared to tolerate common-mode failures.

The described embodiments are well placed to discover communications attacks, such as denial of service, replay or man-in-the-middle attacks. In the example embodiments, any lost, delay, replayed or damaged messages in the information content from one processing module 110 to another will be detected by the downstream VC unit of the subsequent processing modules. Communications failures by any particular processing module 110 are likewise rapidly discovered. The system also provides strong resistance to malicious data leaks (exfiltration) wherein a component attempts to send data out from the system in an unauthorised manner, such as by a live transmission or by storing data for later extraction.

The control system 100 described herein is particularly suitable for unmanned vehicles and especially unmanned aerial systems. The example control system 100 is able to detect damage, attacks or failures in real time by considering anomalous outputs produced by one or more of the processing modules within a particular stage. The example embodiments are able to record and identify threat signatures and modes of operation with forensics capability by monitoring and recording fault report signals, which allows future implementations of the control system to be upgraded and made more robust. The example control system is inherently modular and upgradable with a flexible and responsive architecture. Damage and disruption caused by any threat to the system is limited by the voting cryptography architecture described herein. The system is well able to tolerate and recover quickly to a previously good (clean) state without major loss of functionality, for example in order to continue providing flight, mission or other control functions. The voting cryptography architecture described herein offers rapid containment and quarantine of damaged or infected processing modules.

In summary, the example embodiments have described an improved control system suitable for an unmanned vehicle, amongst many other uses. The industrial application of the example embodiments will be clear from the discussion herein.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

Although a few preferred embodiments have been shown and described, it will be appreciated by those skilled in the art that various changes and modifications might be made without departing from the scope of the invention, as defined in the appended claims.

The invention claimed is:

1. A control system for an unmanned vehicle, the control system comprising:
a control processing unit arranged to receive input signals from one or more sensors and to supply output signals to one or more actuators, the control processing unit comprising a plurality of processing modules which are arranged into a plurality of stages, wherein the stages are successively linked with outputs from a plurality of the processing modules in a preceding first stage being coupled to inputs of one or more of the processing modules in a subsequent second stage, the first stage configured to receive the input signals from the one or more sensors, the second stage configured to receive the outputs of the first stage;

wherein, in the first stage, the plurality of the processing modules produce substantially equivalent payload data and each of the processing modules includes a message cryptography unit which generates cryptographically signed messages containing a source field representing a message source at the first stage, a destination field representing a message destination at the second stage, and the payload data, the message cryptography unit configured to generate a digital signature based at least in part on the message source at the first stage, the message destination at the second stage, and the payload data, wherein the cryptographically signed messages include the digital signature, and wherein, in the second stage, each of the one or more processing modules comprises a voting cryptography unit which receives the cryptographically signed messages from the plurality of processing modules of the first stage, examines the cryptographically signed messages to verify whether the cryptographically signed messages include the message source at the first stage and the message destination at the second stage, and applies voting logic to derive a validated payload data from the cryptographically signed messages for use by the processing module of the second stage.

2. The control system of claim 1, wherein each of the processing modules is a physical hardware component which is separately removable and replaceable within the control system.

3. The control system of claim 1, wherein the processing modules are provided with at least double modular redundancy within each stage.

4. The control system of claim 1, wherein each processing module of the subsequent second stage comprises a processor unit arranged to support one or more logical processing applications which use the validated payload data from the voting cryptography unit of the processing module.

5. The control system of claim 1, wherein the control processing unit comprises a plurality of the processing modules arranged into at least a third stage which is successively linked to the second stage, wherein the processing modules of the second stage each further comprise the message cryptography unit generating the cryptographically signed messages containing the payload data of the processing module and each of the processing modules of the third stage comprises the voting cryptography unit which derives the validated payload data from the cryptographically signed messages for use by the processing module.

6. The control system of claim 1, wherein each of the message cryptography units produces a message stream comprising the cryptographically signed messages, and wherein each of the voting cryptography units in the processing modules of the subsequent stage is arranged to receive a plurality of the message streams from a plurality of the message cryptography units in the processing modules of the preceding stage.

7. The control system of claim 6, wherein the control processing unit comprises a plurality of communications networks, wherein the processing modules within each stage are coupled at their inputs to each of the communications networks and at their outputs to a respective one of the communications networks, each of the communications networks carrying the message streams from the processing modules in the preceding stage to a plurality of the processing modules in a subsequent stage.

8. The control system of claim 1, wherein the message cryptography units are arranged to generate outgoing cryptographically signed messages including a time stamp field containing a time stamp, and each of the voting cryptography units includes a time synchronisation unit arranged to validate the time stamp of incoming cryptographically signed messages.

9. An unmanned aerial vehicle comprising the control system of claim 1.

10. A control method for an unmanned vehicle, the method comprising:
receiving input signals from one or more sensors;
processing the input signals by a plurality of processing modules which are arranged into a plurality of stages, wherein the stages are successively linked with outputs from a plurality of the processing modules in a preceding first stage being coupled to inputs of one or more of the processing modules in a subsequent second stage, the first stage configured to receive the input signals from the one or more sensors, the second stage configured to receive the outputs of the first stage;
producing substantially equivalent payload data by the plurality of the processing modules in the first stage and generating cryptographically signed messages containing a source field representing a message source at the first stage, a destination field representing a message destination at the second stage, and the payload data by a message cryptography unit in each of the processing modules of the first stage, the message cryptography unit configured to generate a digital signature based at least in part on the message source at the first stage, the message destination at the second stage, and the payload data, wherein the cryptographically signed messages include the digital signature;
receiving the cryptographically signed messages by a voting cryptography unit in each processing module of the second stage from the plurality of processing modules of the first stage;
examining the cryptographically signed messages by the voting cryptography unit in each processing module of the second stage to verify whether the cryptographically signed messages include the message source at the first stage and the message destination at the second stage;
applying voting logic to cryptographically signed messages by the voting cryptography unit in each processing module of the second stage to derive a validated payload data from the cryptographically signed messages for use by the processing module of the second stage;
generating an output signal using the validated payload data; and
supplying the output signals to one or more actuators.

11. The control method of claim 10, further comprising:
sending a message stream comprising the cryptographically signed messages by each of the message cryptography units of the processing modules of the first stage; and
receiving the message streams by each of the voting cryptography units in the processing modules of the subsequent stage.

12. The control method of claim 11, further comprising carrying the message streams over a plurality of communications networks, wherein the processing modules within each stage are coupled at their inputs to each of the communications networks and at their outputs to a respective one of the communications networks, each of the communication networks carrying the message streams from the processing modules in the preceding stage to a plurality of the processing modules in a subsequent stage.

13. The control method of claim 10, further comprising passing the payload data substantially unidirectionally through the control processing unit between the plurality of stages.

14. The control method of claim 10, further comprising cryptographically examining the cryptographically signed messages and raising a failure alert condition when the cryptographically signed messages fail the cryptographic examination and/or examining the payload data in the cryptographically signed messages and raising a failure alert condition when the payload data is inconsistent between the messages.

15. The control method of claim 10, further comprising encoding or encrypting at least part of the payload data within the messages using a cryptographic key.

16. A non-transitory computer-readable storage medium having instructions recorded thereon which cause a computer device to perform a control process for an unmanned vehicle, the process comprising:
receiving input signals from one or more sensors;
processing the input signals by a plurality of processing modules which are arranged into a plurality of stages, wherein the stages are successively linked with outputs from a plurality of the processing modules in a preceding first stage being coupled to inputs of one or more of the processing modules in a subsequent second stage, the first stage configured to receive the input signals from the one or more sensors, the second stage configured to receive the outputs of the first stage;
producing substantially equivalent payload data by the plurality of the processing modules in the first stage and generating cryptographically signed messages containing a source field representing a message source at the first stage, a destination field representing a message destination at the second stage, and the payload data by a message cryptography unit in each of the processing modules of the first stage, the message cryptography unit configured to generate a digital signature based at least in part on the message source at the first stage, the message destination at the second stage, and the payload data, wherein the cryptographically signed messages include the digital signature;
receiving the cryptographically signed messages by a voting cryptography unit in each processing module of the second stage from the plurality of processing modules of the first stage;
examining the cryptographically signed messages by the voting cryptography unit in each processing module of the second stage to verify whether the cryptographically signed messages include the message source at the first stage and the message destination at the second stage;
applying voting logic to cryptographically signed messages by the voting cryptography unit in each processing module of the second stage to derive a validated payload data from the cryptographically signed messages for use by the processing module of the second stage;
causing generation of an output signal using the validated payload data; and
causing the output signals to be supplied to one or more actuators.

17. The non-transitory computer-readable storage medium of claim 16, the process further comprising:
sending a message stream comprising the cryptographically signed messages by each of the message cryptography units of the processing modules of the first stage; and
receiving the message streams by each of the voting cryptography units in the processing modules of the subsequent stage.

18. The non-transitory computer-readable storage medium of claim 17, the process further comprising carrying the message streams over a plurality of communications networks, wherein the processing modules within each stage are coupled at their inputs to each of the communications networks and at their outputs to a respective one of the communications networks, each of the communication networks carrying the message streams from the processing modules in the preceding stage to a plurality of the processing modules in a subsequent stage.

19. The non-transitory computer-readable storage medium of claim 16, the process further comprising passing the payload data substantially unidirectionally through the control processing unit between the plurality of stages.

20. The non-transitory computer-readable storage medium of claim 16, the process further comprising at least one of:
cryptographically examining the cryptographically signed messages and raising a failure alert condition when the cryptographically signed messages fail the cryptographic examination and/or examining the payload data in the cryptographically signed messages and raising a failure alert condition when the payload data is inconsistent between the messages; and
encoding or encrypting at least part of the payload data within the messages using a cryptographic key.

* * * * *